Figure 1:
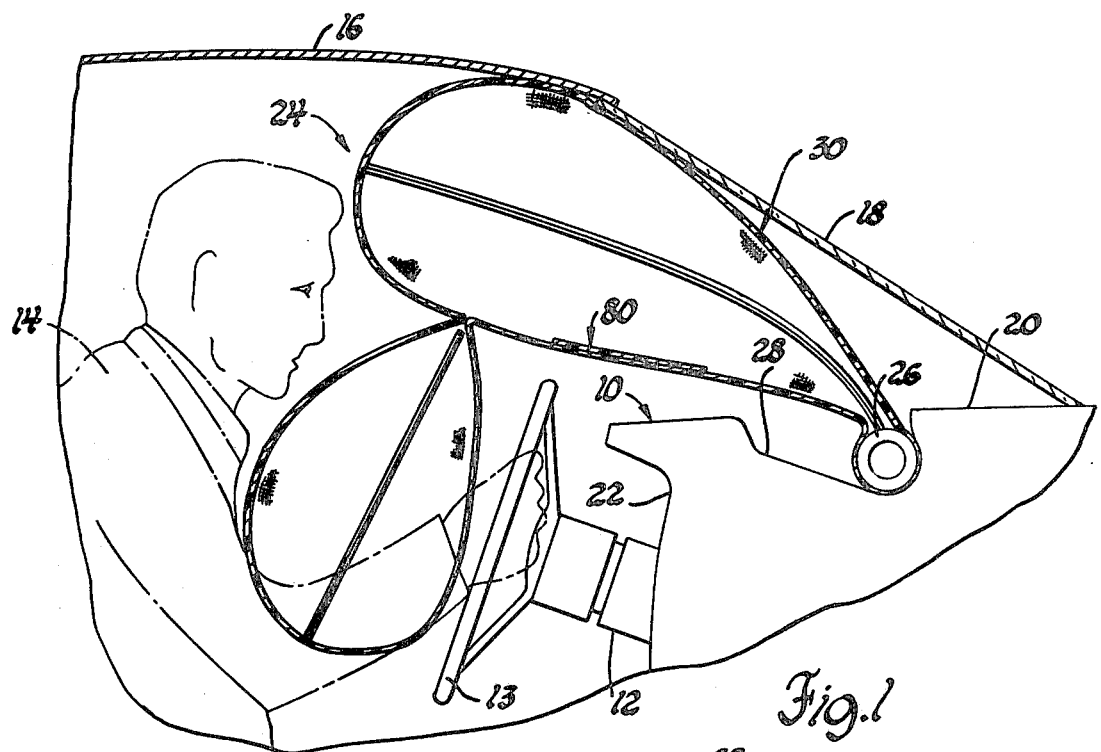

United States Patent [19]
Barnett

[11] 4,181,325
[45] Jan. 1, 1980

[54] OCCUPANT RESTRAINT CUSHION

[75] Inventor: Ronald R. Barnett, Rochester, Mich.

[73] Assignee: General Motors Corporation, Detroit, Mich.

[21] Appl. No.: 4,759

[22] Filed: Jan. 19, 1979

Related U.S. Application Data

[62] Division of Ser. No. 883,895, Mar. 6, 1978.

[51] Int. Cl.² ............................................. B60R 21/08
[52] U.S. Cl. .................................... 280/739; 137/852
[58] Field of Search ............................... 280/728–743; 137/843, 852

[56] References Cited

U.S. PATENT DOCUMENTS

| | | | |
|---|---|---|---|
| 2,272,896 | 2/1942 | Pidgeon | 137/852 |
| 3,586,347 | 6/1971 | Carey | 280/732 |
| 3,768,830 | 10/1973 | Hass | 280/729 |
| 3,801,126 | 4/1974 | Knight | 280/732 |
| 3,817,552 | 6/1974 | Knight | 280/732 |
| 3,887,213 | 6/1975 | Goetz | 280/738 |
| 3,930,664 | 1/1976 | Parr | 280/732 |
| 3,990,726 | 11/1976 | Oka | 280/739 |

Primary Examiner—John P. Silverstrim
Attorney, Agent, or Firm—Edward J. Biskup

[57] ABSTRACT

An occupant restraint cushion made of a single sheet of woven material and having an upper compartment that is adapted to engage the windshield of a vehicle and be guided thereby rearwardly when deployed so that subsequently a lower compartment extends downwardly from the upper compartment and is inflated in a position between the driver and the steering wheel.

1 Claim, 9 Drawing Figures

OCCUPANT RESTRAINT CUSHION

This is a Division, of application Ser. No. 883,895 filed on Mar. 6, 1978.

This invention concerns an occupant restraint cushion in general and more particularly relates to a multicompartment cushion that is normally housed in the instrument panel of a motor vehicle and is adapted to be deployed rearwardly therefrom into a position between the vehicle driver and the steering wheel.

More particularly, the occupant restraint cushion according to the invention is combined with a motor vehicle body having an instrument panel and a steering wheel supported for controlled rotational movement by a vehicle operator. The occupant restraint cushion is adapted to be stored in the upper portion of the instrument panel and to be deployed rearwardly relative thereto by an appropriate gas generator which is activated under predetermined deceleration conditions caused by vehicle impact with an obstacle. The occupant restraint cushion comprises a top wall and a bottom wall joined at their outer edges so as to define an upper compartment having a front end which is attached to the gas generator housing within the instrument panel and a rear end adapted to be located above and to the rear of a steering wheel when the upper compartment is inflated. The bottom wall is divided into a front section and a rear section with a front wall depending from the front section and a rear wall depending from the rear section. The front and rear walls are connected to each other at the outer edges thereof so as to define a lower compartment located intermediate the front and rear ends of the upper compartment. The lower compartment is adapted to be positioned between the vehicle operator and the steering wheel when inflated. Suitable means are provided for directly joining and sealing the front wall to the rear wall adjacent the upper compartment so as to provide at least one orifice of a predetermined size for connecting the upper compartment with the lower compartment to thereby control gas flow therebetween and cause the upper compartment to be partially inflated prior to inflation of the lower compartment.

The objects of the present invention are to provide a new and improved occupant restraint cushion having two separate compartments one of which is inflated prior to the full inflation of the other; to provide a new and improved occupant restraint cushion that is positioned in the upper portion of the vehicle instrument panel in front of the driver and is adapted to be deployed rearwardly therefrom into a position between the driver and the steering wheel; to provide a new and improved occupant restraint cushion that is connected with a gas generator mounted in the upper portion of a vehicle instrument panel and includes an elongated inflatable upper compartment which communicates through suitable orifice means with a lower compartment; to provide a new and improved two-compartment inflatable restraint cushion for a motor vehicle that is made from a single sheet of woven material which in the uninflated state has a top flat wall and a bottom flat wall, the latter of which is composed of two sections that are integral with depending front and rear walls and in which one of the sections is provided with a pressure relief valve that prevents full inflation of the cushion if an obstruction prevents full deployment thereof; and to provide a new and improved occupant restraint cushion made of a porous woven material and that has an upper compartment and a depending lower compartment which are interconnected through orifice means with the upper compartment having a pressure relief valve that causes the gas within the cushion to be exhausted to atmosphere under conditions which prevent full deployment of the cushion.

Figure 2:
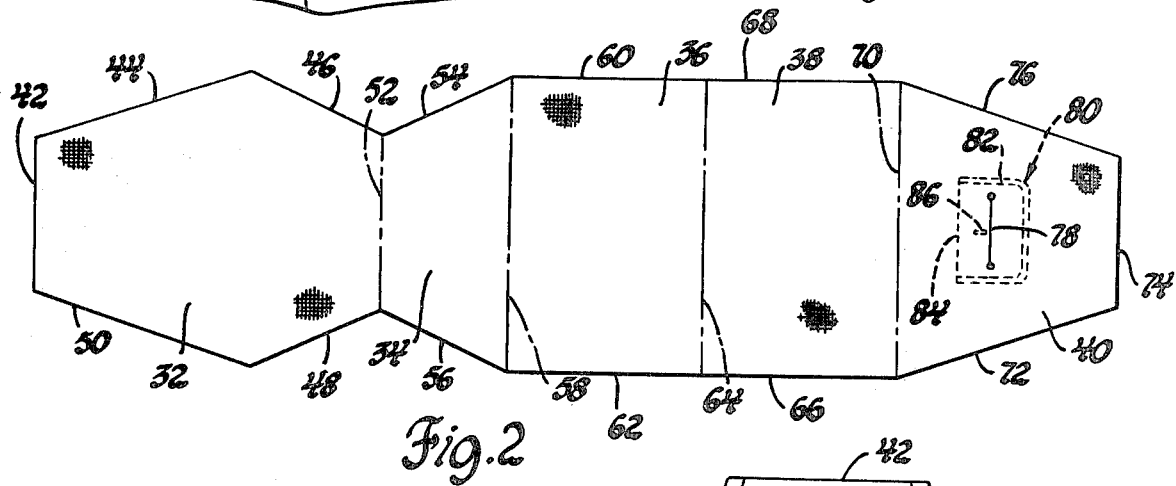
Figure 3:
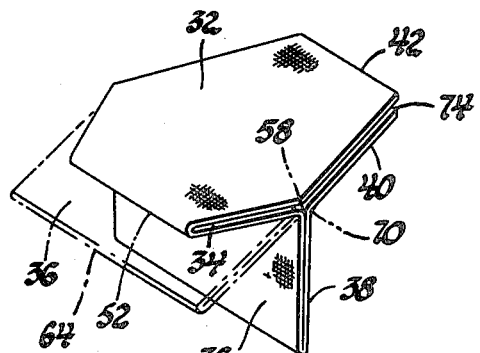
Figure 4:
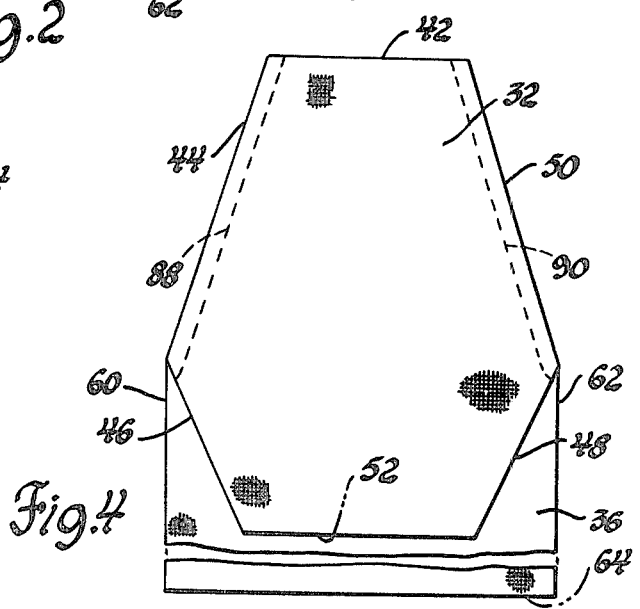
Figure 5:
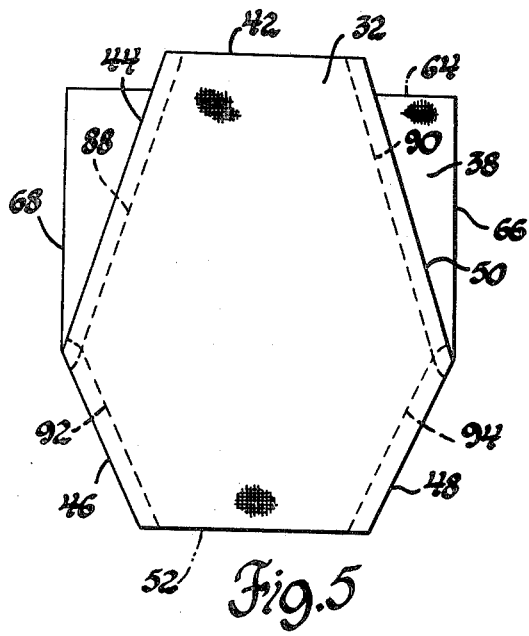
Figure 6:
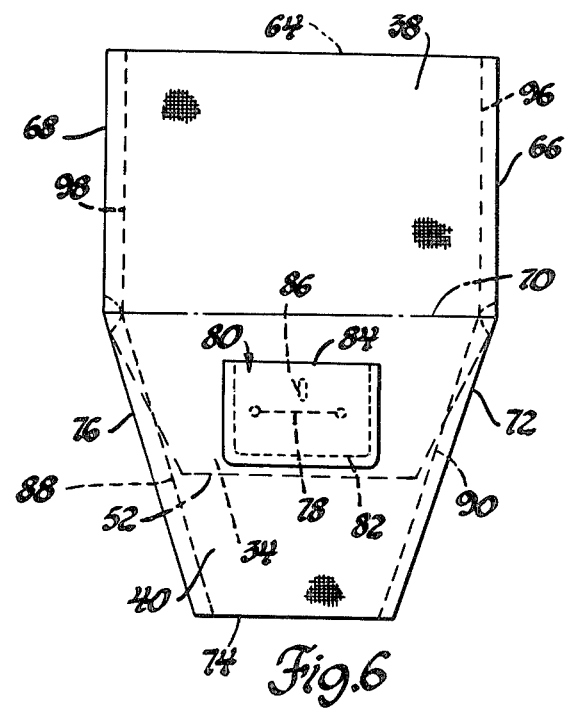
Figure 7:
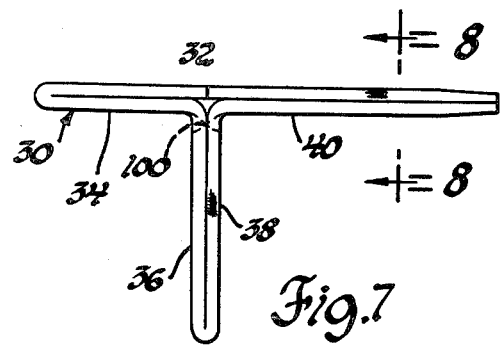
Figure 9:
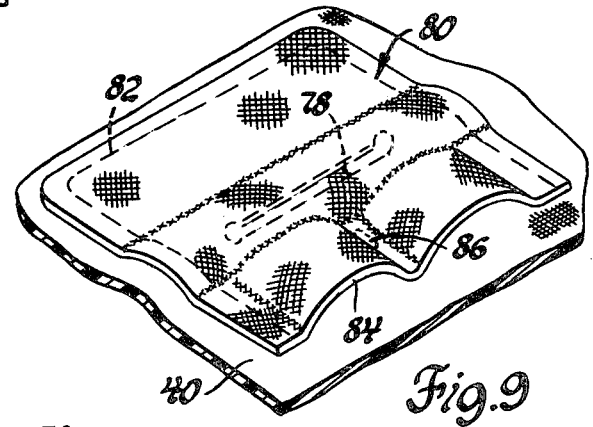
Figure 8:
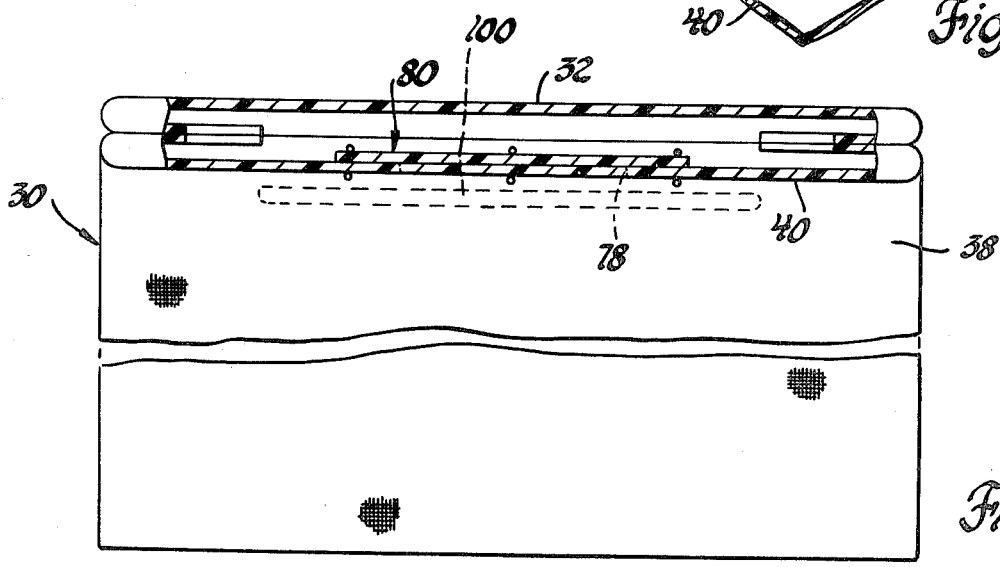

Other objects and advantages of the invention will be more apparent from the following detailed description when taken with the drawings in which:

FIG. 1 is a view showing an occupant restraint cushion made according to the invention connected with a gas generator housed within the upper instrument panel portion of a vehicle and being fully inflated with the upper compartment of the cushion positioned adjacent the vehicle roof while the lower compartment is positioned between the driver and the steering wheel, FIG. 2 shows a blank sheet of woven material used for making the occupant restraint cushion of FIG. 1, FIG. 3 is a perspective view showing the blank sheet of woven material of FIG. 2 folded so as to form the upper and lower compartments thereof prior to having the edges of the material sewn together, FIG. 4 is a top view of the folded blank sheet shown in FIG. 3 with the lower compartment portion located in a plane parallel to the plane of the upper compartment portion and with two of the sides edges thereof sewn together, FIG. 5 is a view similar to FIG. 4 but with the lower compartment portion extending in a direction opposite that shown in FIG. 4 and with two additional side edges sewn together, FIG. 6 is a view similar to FIG. 5 but with the front section of the upper compartment portion being located on top of the rear section of the upper compartment portion and with the two side edges of the lower compartment portion sewn together, FIG. 7 is a side elevational view of a completed occupant restraint cushion such as seen in FIG. 6 with the inside and outside reversed, FIG. 8 is a view of the completed occupant restraint cushion taken on line 8—8 of FIG. 7, and FIG. 9 is a perspective view showing the pressure relief valve incorporated with the upper compartment portion of the restraint cushion with the relief valve being in the opened position as a result of the slack condition of the lower wall.

Referring now to the drawings and more particularly FIG. 1 thereof, a vehicle is shown schematically including an instrument panel 10 positioned forwardly of a conventional steering wheel assembly 12 that has a steering wheel 13 controlled by the vehicle operator 14. The front portion of the roof 16 of the vehicle is attached to the usual windshield 18 which extends forwardly and terminates at the instrument panel 10. The instrument panel 10 includes an upper surface 20 which faces the windshield 18 and a frontal surface 22 located in generally spaced relationship to the steering wheel 13. An occupant restraint cushion system 24 is schematically shown as including a gas generator or pressure vessel 26 providing a source of pressure fluid that is located within the instrument panel 10. In this connection, it will be noted that a cavity 28 is formed in the upper surface 20 of the instrument panel 10 for fixedly accommodating the gas generator 26 which serves to inflate a restraint cushion 30 made according to the invention. As is conventional, the gas generator 26 communicates with a diffuser that is concentrically positioned with respect to the gas generator and extends generally transversely of the vehicle. A suitable sensor, not shown, furnishes a signal under predetermined conditions which causes the gas generator to be activated to inflate the occupant restraint cushion 30. The restraint cushion 30, when inflated by the pressurized gas, provides a restraint limiting the movement of the seated occupant relative to the steering wheel 13.

As seen in FIG. 2, the occupant restraint cushion 30 is formed from a single sheet blank of woven material which assumes the pattern shown. The woven material can be made from a Dacron or Nylon yarn and has a porosity that allows the restraint cushion to remain inflated for a sufficiently long time after inflation and yet allow the contained gas to be exuded upon impact. The blank is composed of the following sections which are integrally connected and are serially arranged starting from the left hand end to the right hand end: top wall section 32, rear bottom wall section 34, rear wall section 36, front wall section 38 and front bottom wall section 40. The top wall section is bounded by angularly related straight outer edges 42, 44, 46, 48, 50 and also an imaginary straight line indicated by the numeral 52. The rear bottom wall section 34 is bounded by the outer edges 54 and 56 and the imaginary straight lines indicated by reference numerals 52 and 58. The rear wall section 36 and the front wall section 38 are identical in size and configuration and are respectively defined by straight parallel outer edges 60 and 62, imaginary straight parallel lines 58 and 64 and straight parallel outer edges 66 and 68 and imaginary straight parallel lines 64 and 70. Similarly, the front bottom wall section 40 is defined by straight outer edges 72, 74, 76 and imaginary straight line 70 which is common with the front wall section 38 and parallel to the edge 74.

In manufacturing the restraint cushion, a blank of woven material having the pattern shown in FIG. 2 is first cut from a single sheet of a suitable material such as Nylon or Dacron having a suitable porosity as explained hereinbefore. The front bottom wall section 40 is then provided with a slit 78 that is located midway between edges 72 and 76 and along a straight line that extends transversely to the longitudinal axis of the blank. A generally rectangular patch 80 of the same material as that used for the blank is then placed over the slit 78 on the back side of section 40 and afterwards the patch is sewn to the section 40 along a U-shaped path indicated by reference numeral 82 so as to close three of the straight edges of the patch while leaving one edge open. The open edge is indicated by the reference numeral 84 and faces the imaginary line 70. An oblong circular stitch 86 is then provided for securing a midpoint of the patch 80 to the section 40. The patch and slit combination provide a pressure relief valve for the restraint cushion that functions in a manner to be explained hereinafter.

The front bottom wall section 40 is then raised and moved towards the rear bottom wall section 34 so that the imaginary line 70 and imaginary line 58 are coincidental with the front wall section 38 overlaying rear wall section 36. At this point, the pattern of the joined sections 34 and 40 is identical to the pattern of the top wall section 32 so that folding of the latter section along line 52 onto the abutting sections 34 and 40 arranges the various sections into the configuration seen in FIG. 3. Moreover, when this is done, the rear wall section 36 and the front wall section 38 provide a depending portion that forms the lower compartment of the restraint cushion 30 as will hereinafter be explained.

With the various sections of the blank assuming the relative positions shown in FIG. 3, the front and rear wall sections 38 and 36 are then raised upwardly so as to be located in a plane parallel to the plane of the top and bottom wall sections as shown in phantom lines. As seen in FIG. 4, the restraint cushion 30 is then sewn along edges 44 and 50 so as to fixedly connect the top wall section 32 to the rear bottom wall section 40. In this connection, it will be noted that a straight line stitch 88 is provided parallel to the edge 44 starting at the edge 42 and ending just beyond the point of intersection of edges 44 and 46. Similarly, a straight line stitch 90 is provided parallel to the edge 50 starting at edge 42 and ending just beyond the intersection of edges 50 and 48.

The sections 36 and 38 are then folded along lines 58 and 70 into the position shown in FIG. 5 so as to have the section 38 contacting the front bottom wall section 40. The abutting edges 46, 54 and 48, 56 of the top wall section 32 and the rear bottom wall section 34 are then sewn together by straight line stitches 92 and 94 as seen in FIG. 5. In this case, the stitch 92 is parallel to the edge 46 and starts at line 52 and ends just beyond the intersection of edges 44 and 46 with a portion of the stitch crossing over the stitch 88. Similarly, the stitch 94 is parallel to the edge 48 starting at line 52 and ending just beyond the intersection of edges 48 and 50 while crossing over stitch 90. Subsequently, the front bottom wall section 40 together with the connected portion of top wall section 32 is folded along line 70 so as to expose the front and rear wall sections 36 and 38, as seen in FIG. 6 The rear wall section 36 and the front wall section 38 are then joined together by stitches 96 and 98 along the edges 66 and 68, respectively. Stitch 96 is provided along a straight line parallel to edge 66 starting at imaginary line 64 and ending just beyond the intersection of edges 72 and 66 while crossing over stitches 90 and 94 at the point intersection of the latter. Also, stitch 98 is formed along a straight line parallel to edge 68 and starts at the line 64 and ends just beyond the intersection of edges 76 and 68 while crossing over stitches 88 and 92 at the point of intersection of the latter.

Once the blank sheet has been sewn together as described above, the material then is reversed inside-out by pulling the inside of the material through the opening between edges 42 and 74 so as to place the inside surface of the material on the outside and the outside of the material on the inside. This then results in the stitched edges being located on the inside of the cushion as seen in FIGS. 7 and 8. The front wall section 36 is then joined directly to the rear wall section 38 by sewing an oblong closed stitch pattern 100 centrally located between the side edges of the lower compartment as shown in FIG. 8. It will be noted that the stitch pattern 100 extends parallel to the top and bottom wall sections and the lines 58 and 70 but stops short at each end from connecting with the joined side edges 62, 66 and 60, 68 of the front and rear wall sections 36 and 38 which define the lower compartment of the restrained cushion. As a result, the areas on the opposite sides of the stitch pattern 100 provide passages or orifice means for communicating the upper compartment defined by the top and bottom walls with the lower compartment. The final step in making the restraint cushion requires the substantial closing of the opening at the edges 42 and 74. This is accomplished by sewing a stitch adjacent and parallel to the edges 42, 74 so as to join the sections 32 and 40 together while at the same time leaving an opening of a sufficient size therebetween to allow insertion of the gas generator 26 into the restraint cushion.

Once the restraint cushion 30 is made as described above, the gas generator 26 is placed within the interior of the cushion and the latter is then appropriately folded so that it can be placed together with the gas generator into the cavity 28 in the instrument panel 10. Through appropriate fastening means, the gas generator 26 and the restraint cushion 30 are fastened in position within the instrument panel 10 so that upon activation of the gas generator, the restraint cushion 30 will deploy rearwardly and inflate the upper compartment as seen in FIG. 1 followed by inflation of the lower compartment. During rearward deployment of the restraint cushion, the upper compartment contacts the windshield 18 initially so that the latter serves to guide the upper compartment for proper downward positioning of the lower compartment between the steering wheel 13 and the occupant 14. It will be understood that the speed with which the lower compartment is inflated will be dependent upon the size of the aforementioned passages located between the upper and lower compartments. In addition, it has been found that it is important to have the restraint cushion 30 constructed so that the front wall section 36 is directly joined to the rear wall section 38 as by the stitch pattern 100. This arrangement assures that the lower compartment is properly positioned between the occupant and the steering wheel when the cushion is inflated.

A restraint cushion such as described above has been successfully tested in a vehicle having an instrument panel and steering wheel sized and positioned as found in 1978 "A" Body GM vehicles. With reference to the restraint cushion 30 shown in FIGS. 7 and 8, the tested restraint cushion had the following dimensions:

Longitudinal length of top wall section 32—30.00 inches Longitudinal length of rear bottom wall section 34—11.25 inches Longitudinal length of front bottom wall section 40—18.75 inches vertical length of front and rear wall sections 36 and 38—14.50 inches Horizontal width of front and rear wall sections 36 and 38—28.50 inches Longitudinal length of stitch pattern 100—12.00 inches As alluded to hereinbefore, the patch and slit arrangement incorporated with the front bottom wall section 40 serves as a pressure relief valve. Normally, when the occupant 14 is properly seated behind the steering wheel 13, the deployment of the restraint cushion causes the upper compartment to fully inflate and results in the front bottom wall section 40 being in a taut condition so that internal pressure causes the patch 80 to lie flat against the material of section 40 to thereby close the slit 78 and prevent escape of gas therethrough. However, if the occupant 14 is leaning forwardly towards the steering wheel 13 so as to block the path of the upper compartment and thereby prevent full deployment of the restraint cushion, the material of section 40 will tend to wrinkle or be slack to the extent that the patch 80 adjacent the stitch 86 raises from the material of section 40 and thereby provides a passage for the gas to partially escape as seen in FIG. 9. The escaping gas does not allow full inflation of the restraint cushion.

It will be noted that although the method of making the restraint cushion 30 as explained hereinbefore utilizes a sewn stitch pattern for joining the several sections together, other methods can be used such as heat bonding it being only important that the method provides a sufficiently good connection which will resist separation of the sections during inflation of the restraint cushion and during occupant impact thereof.

Various changes and modification can be made in this construction without department from the spirit of the invention. Such changes and modifications are contemplated by the inventor and he does not wish to be limited except by the scope of the appended claims.

The embodiments of the invention in which an exclusive property or privilege is claimed are defined as follows:

1. In combination with a vehicle body having an instrument panel, an occupant restraint cushion system located in said instrument panel and comprising a housing fixedly mounted to said vehicle body, a restraint cushion formed of a porous woven material and having at least two wall sections defining a compartment, a portion of said restraint cushion being secured to said housing, a gas generator located in said compartment for inflating said restraint cushion under predetermined conditions so as to cause the restraint cushion to be deployed outwardly relative to said instrument panel, one of said wall sections of said restraint cushion having a slit formed therein, and a patch located within said compartment covering said slit and fixedly connected to the associated wall section so as to provide a passage to the slit when an obstacle prevents full deployment of said restraint cushion to thereby relieve the pressure within the restraint cushion and prevent full inflation thereof.

* * * * *